(12) United States Patent
Cosgrove, Jr. et al.

(10) Patent No.: US 7,418,317 B2
(45) Date of Patent: Aug. 26, 2008

(54) SYSTEM AND METHOD FOR CONTROLLING AND COMMUNICATING WITH A VEHICLE

(75) Inventors: Allen F. Cosgrove, Jr., Westminster, MD (US); David D. Floyd, Shrewsbury, PA (US); Michael E. Woodbury, York, PA (US); Wayne H. Chelden, Hampstead, MD (US); W. Andrew Clark, Towson, MD (US)

(73) Assignee: AAI Corporation, Hunt Valley, MD (US)

( * ) Notice: Subject to any disclaimer, the term of this patent is extended or adjusted under 35 U.S.C. 154(b) by 60 days.

(21) Appl. No.: 11/326,452

(22) Filed: Jan. 6, 2006

(65) Prior Publication Data

US 2006/0271248 A1    Nov. 30, 2006

Related U.S. Application Data

(60) Provisional application No. 60/660,067, filed on Mar. 10, 2005.

(51) Int. Cl.
*G06F 17/00* (2006.01)
*G05D 1/00* (2006.01)

(52) U.S. Cl. ............................................. 701/1; 701/2

(58) Field of Classification Search ....................... None
See application file for complete search history.

(56) References Cited

U.S. PATENT DOCUMENTS

| 5,758,313 | A | * | 5/1998 | Shah et al. ................ 455/456.2 |
| 6,098,073 | A | * | 8/2000 | O'Rourke ................ 707/104.1 |
| 6,694,228 | B2 | | 2/2004 | Rios |
| 6,873,886 | B1 | | 3/2005 | Mullen et al. |
| 7,305,289 | B2 | * | 12/2007 | Gessner et al. ................ 701/33 |

* cited by examiner

*Primary Examiner*—Michael J. Zanelli
(74) *Attorney, Agent, or Firm*—Venable LLP; Jeffri A. Kaminski

(57) ABSTRACT

Embodiments of the present invention provide a software core controller for facilitating communication between a UAV control system, a UAV, and other peripheral devices used to control or to determine the status of the UAV. Different UAVs, control systems, and peripheral devices may require that data be transmitted and received according to their own particular specifications, such as a particular data rate and a particular format. The software core controller may be configurable to interface with these devices using the devices' interfaces. The interfaces may be specified by the devices' interface control documents (ICDs). The ICDs may be used to configure the software core controller upon initialization. The software core controller may asynchronously receive and provide data at the data rate specified in the various ICDs. The software core controller may support a plurality of different physical interfaces in order to communicate with different control systems, UAVs, and peripheral devices.

24 Claims, 5 Drawing Sheets

SYSTEM AND METHOD FOR CONTROLLING AND COMMUNICATING WITH A VEHICLE

CROSS REFERENCE TO RELATED APPLICATIONS

This application claims the benefit of U.S. Provisional Application No. 60/660,067, filed Mar. 10, 2005, the contents of which are incorporated herein by reference in their entireties.

BACKGROUND OF THE INVENTION

There is an increased emphasis on the use of unmanned air vehicles (UAVs) for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

Several different types of UAVs have been developed in order to perform these various missions. Some of these UAVs have been specially designed to focus on a single mission. Control and communication systems for UAVs may be tailored to a particular type of UAV or to meet specific mission requirements. Additionally, there are several ways to control a UAV, a ground control station (GCS), an automated landing system (ALS), and a pilot box.

Each of the different UAVs, their control and communication systems, and the different ways of controlling a UAV may not be compatible with each other. For example, a pilot box that may be used with a first type of UAV may not be able to communicate with and control a second type of UAV. This presents problems when organizations using a variety of different types of UAVs, such as the armed services, wish to reuse or interchange parts among UAVs. Additionally, as new UAVs are developed, serviceable control and communications equipment from prior UAVs may not be reused with the newly-developed UAVs.

Consequently, there is a desire to control different types of UAVs using a single control system. Further objectives and advantages, as well as the structure and function of exemplary embodiments will become apparent from a consideration of the description, drawings, and examples.

SUMMARY OF THE INVENTION

Embodiments of the present invention provide a software system architecture for communications between a vehicle and at least one external device. The software system architecture comprises a control database; a controller adapted to communicate data with the vehicle and the external device in a format defined by a vehicle interface and an external device interface, respectively, the controller adapted to store the data in the control database.

Embodiments of the present invention provide a method for communicating with a vehicle system. The method comprises receiving an interface definition; creating software code constructs based on the interface definition; compiling the software code constructs as part of vehicle control system; and running the compiled software code constructs to communicate with the vehicle.

Further embodiments include populating a database with the interface definitions; creating a text file from the database; and creating the source code constructs based on the text files.

Further embodiments of the invention provide a communication and control method. The method comprises receiving data from a plurality of devices, the devices having different interface definitions; storing the data on a storage, for example in database data item; checking the storage at predefined time intervals for data; retrieving the data from the storage; interpreting the data based on the interface definition for the device; obtaining a message ID from the data; determining a time based on the number of elapsed time intervals; creating a message controller for each of the plurality of devices; and sending a message to at least one of the plurality of devices based on the message ID or the time.

BRIEF DESCRIPTION OF THE DRAWINGS

The accompanying drawings, which are incorporated herein and form part of the specification, illustrate embodiments of the present invention and, together with the description, further serve to explain the principles of embodiments of the invention.

It should be understood that these figures depict embodiments of the invention. Variations of these embodiments will be apparent to persons skilled in the relevant art(s) based on the teachings contained herein.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Exemplary embodiments of the present invention provide a software development tool and software controller for facilitating communications between a vehicle control system, a vehicle, and other peripheral devices used to control and/or to determine the status of a vehicle. Although the exemplary embodiments are described herein with reference to a UAV, the scope of the present invention is not intended to be limited to a UAV. Other vehicles, such as manned air vehicles, manned or unmanned surface ships, submarines, and ground vehicles are also contemplated and within the scope of the invention.

Embodiments of the present invention provide a controller, such as a software core controller, for facilitating communication between a UAV control system, a UAV, and other peripheral devices used to control or to determine the status of the UAV. Some examples of the peripheral devices include a ground data terminal (GDT), a pilot box, an automatic landing system (ALS), such as Tactical Automatic Landing System (TALS) or UAV Common Automatic Recover System (UCARS), payloads, such as cameras, weapons, etc., or graphical user interfaces. Different UAVs, control systems, and peripheral devices may require that data be transmitted and received according to their own particular specifications, such as a particular data rate and a particular format. The software core controller may be configurable to interface with these devices using the devices' interfaces. The interfaces may be specified by the devices' interface control documents (ICDs). The ICDs may be used to configure the software core controller upon initialization. The software core controller may asynchronously receive and provide data at the data rate specified in the various ICDs. The software core controller may support a plurality of different physical interfaces in order to communicate with different control systems, UAVs, and peripheral devices. The physical interfaces may include, for example, TCP/IP, UDP, parallel ports, USB ports, and serial communications ports.

Embodiments of the invention also provide a method and system to map each of the devices' messages as specified in their ICD to other devices' messages.

Figure 1:
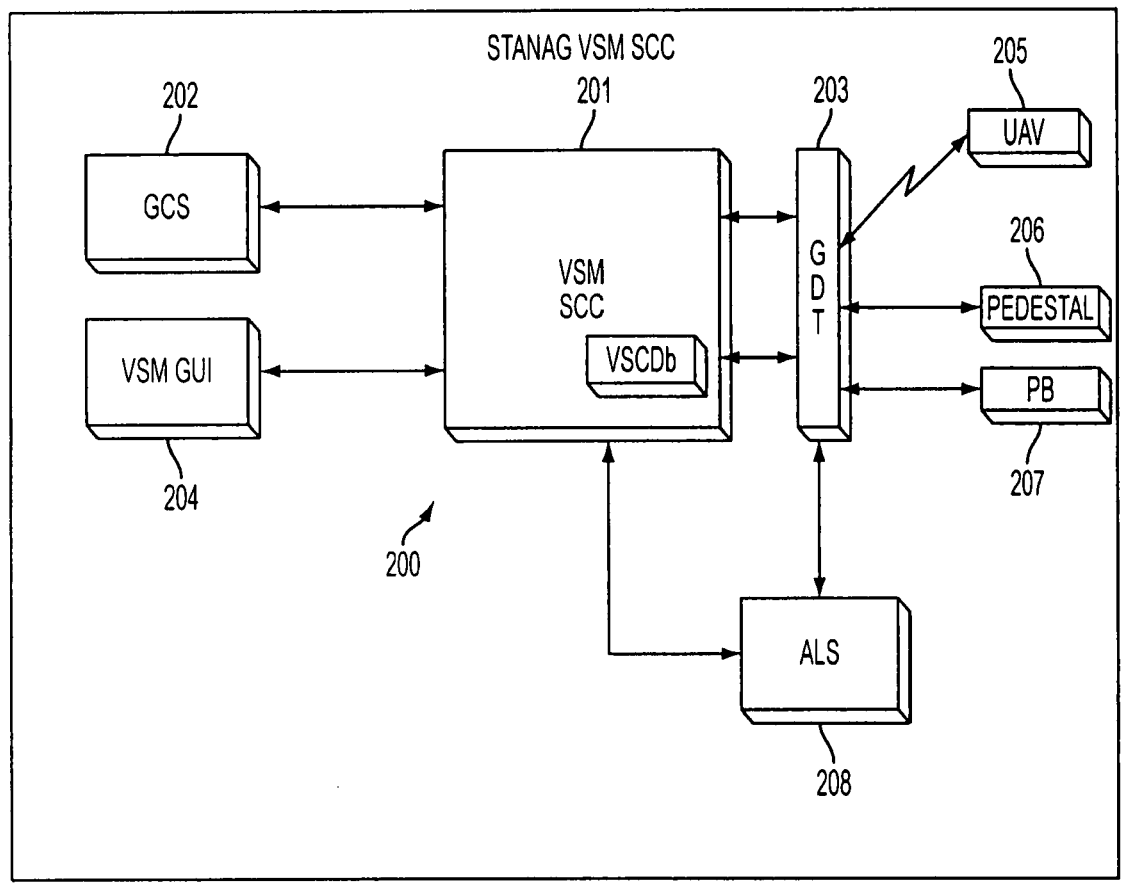
FIG. 1 is a block diagram of a system architecture according to an exemplary embodiment of the present invention.

FIG. 1 illustrates an example of a system 200 according to exemplary embodiments of the present invention. As shown in FIG. 1, system 200 may include software core controller (SCC) 201, ground control station (GCS) 202, ground data terminal (GDT) 203, vehicle-specific module (VSM) graphical user interface (GUI) 204, UAV 205, pedestal 206, pilot box (PB) 207, and automatic landing system (ALS) 208. The SCC 201 controls real-time communication between the UAV and the control/status devices. Different devices may communicate with the SCC 201 to form system 200. According to embodiments of the invention, the SCC 201 is configurable to communicate with the different devices according to the devices ICDs. Information regarding the ICDs may be stored in one or more configuration file. The configuration file defines what devices are coupled to the SCC 201 and how the SCC 201 should communicate with the devices. The configuration file is used to configure the SCC 201 during initialization of the system. The SCC 201 may be easily modified to communicate with different devices by changing the configuration file.

External interfaces are used for communication among the SCC 201, UAV 205 and the control/status devices. Each control/status devices' ICD defines the interface's protocol and message format. In the embodiment shown, interface E1 is the interface between the GCS 202 and the SCC 201. This connection is typically a UDP LAN connection. Control commands are sent from the GCS 202 to the SCC 201 via this interface. The SCC 201 sends status information received from the UAV 205, GDT 203, or ALS 208 to the GCS 202 via this interface. For UAVs, interface E1 is typically defined by *NATO Standardisation Agency* (NSA) *STANDARDISATION AGREEMENT*(*STANAG*) 4586 Edition 2 (March 2005) *with Errata* 1 (16 Sep. 2005). Interface E2 is used for communication between the UAV 205 and the SCC 201, via the GDT 203. This connection is typically implemented via a serial port. Status and control commands are communicated between the UAV 205 and the SCC 201 via this interface. Interface E3 is used for communication between the ALS 208 and the SCC 201. This connection is typically implemented via a serial port. ALS 208 sends status information to the SCC 201 and receives control commands from the SCC 201 via this interface. Interface E4 is used for communication between the PB 207 and the GDT 203. This interface is typically implemented via a serial port connection. The PB 207 sends status information to the GDT 203 and receives control commands from the GDT 203 via this interface. Interface E5 is used for communication between the ALS 208 and the GDT 203. This connection is typically implemented via a serial port connection. The ALS 208 sends status information to the GDT 203 and receives control commands from the GDT 203 via this interface. Interface E6 is used for communication between the pedestal 206 and the GDT 203. This interface is typically implemented via a serial port connection. The pedestal 206 communicates status information to the GDT 203 and receives control commands from the GDT 203 via this interface. Interface E7 is used for communication between the VSM GUI 204 and the SCC 201. This interface is typically implemented using a UDP LAN connection. The VSM GUI 204 sends control commands to the SCC 201 and receives status information from SCC 201 via this interface. Interface E8 is another interface between the GDT 203 and the SCC 201. This connection is typically implemented via a serial port connection. The GDT 203 communicates status information from the GDT 203, pedestal 206, PB 207, or ALS 208 to the SCC 201 via this interface. Additionally, control commands for the GDT 203, pedestal 206, PB 207, or ALS 208 are sent from the SCC 201 to the GDT 203 via this interface.

Figure 2:
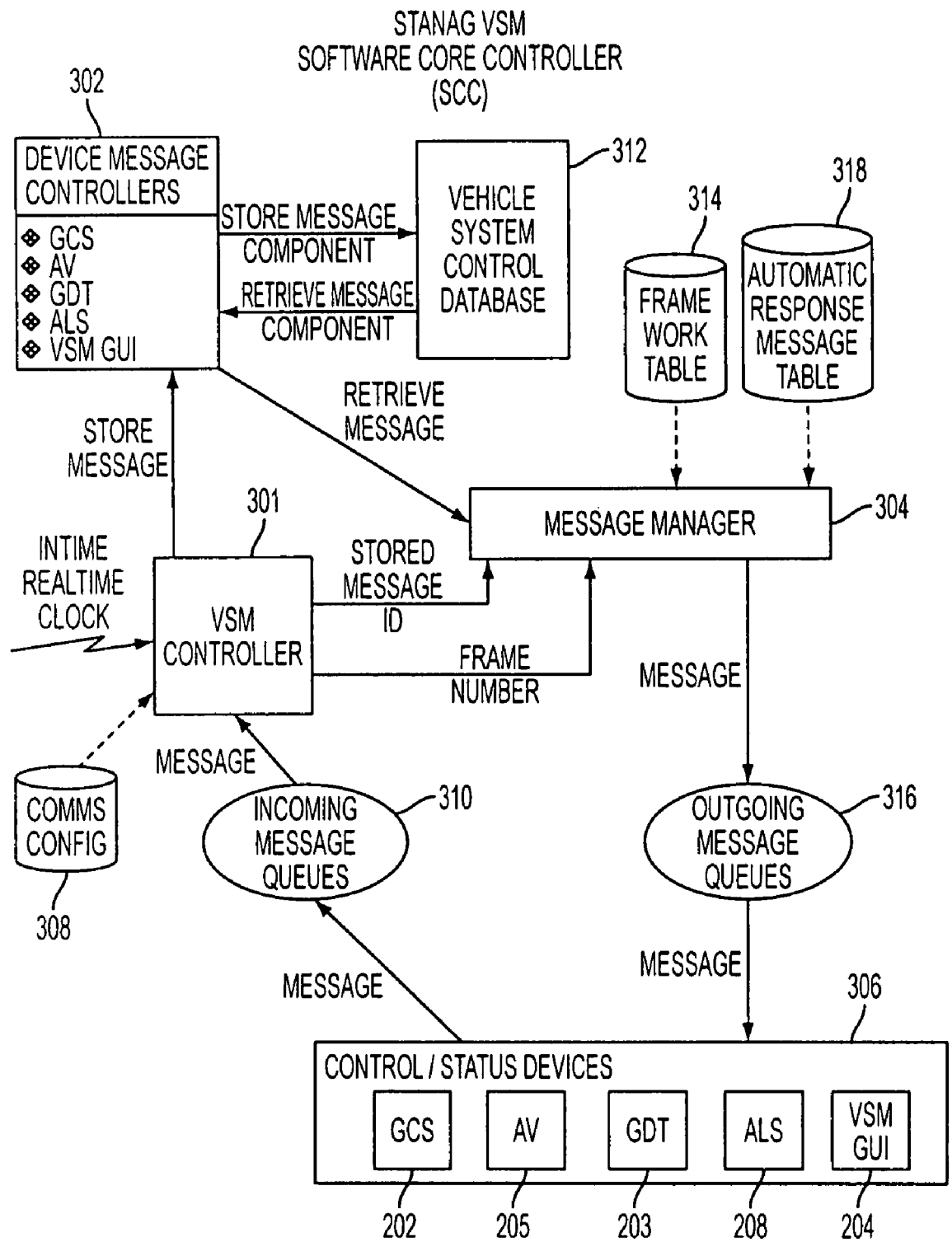
FIG. 2 is a more detailed diagram of an exemplary embodiment of the software core controller of FIG. 1.

Referring now to FIG. 2, an exemplary system and method for communicating information between the various control/status devices via the SCC 201 is described. The embodiment of the SCC 201 shown includes a VSM controller 301, device message controllers 302, and a message manager 304. The VSM controller 301 controls real-time communication between the control/status devices 306, such as the UAV 205, GCS 202, GDT 203, ALS 208, VSM GUI 204 and others. The VSM controller 301 may connect to the control/status devices 306 via different physical interfaces, such as serial ports and LAN ports. A data storage, such as communication configuration database 308, may store information regarding the devices' 306 ICDs. The database 308 may be preloaded with the most common types of interfaces, but is also expandable to store the definitions of additional interfaces. The ICDs may be stored as text files. According to embodiments of the invention, the text files may include the definition of the interface as serial or LAN, a baud rate for the interface, a number of stop bits, the size of the message, etc. The VSM controller 301 may be configured based on the text files in the database 308 and utilize the text files stored in the database to interpret the messages received from the control/status devices.

Figure 4:
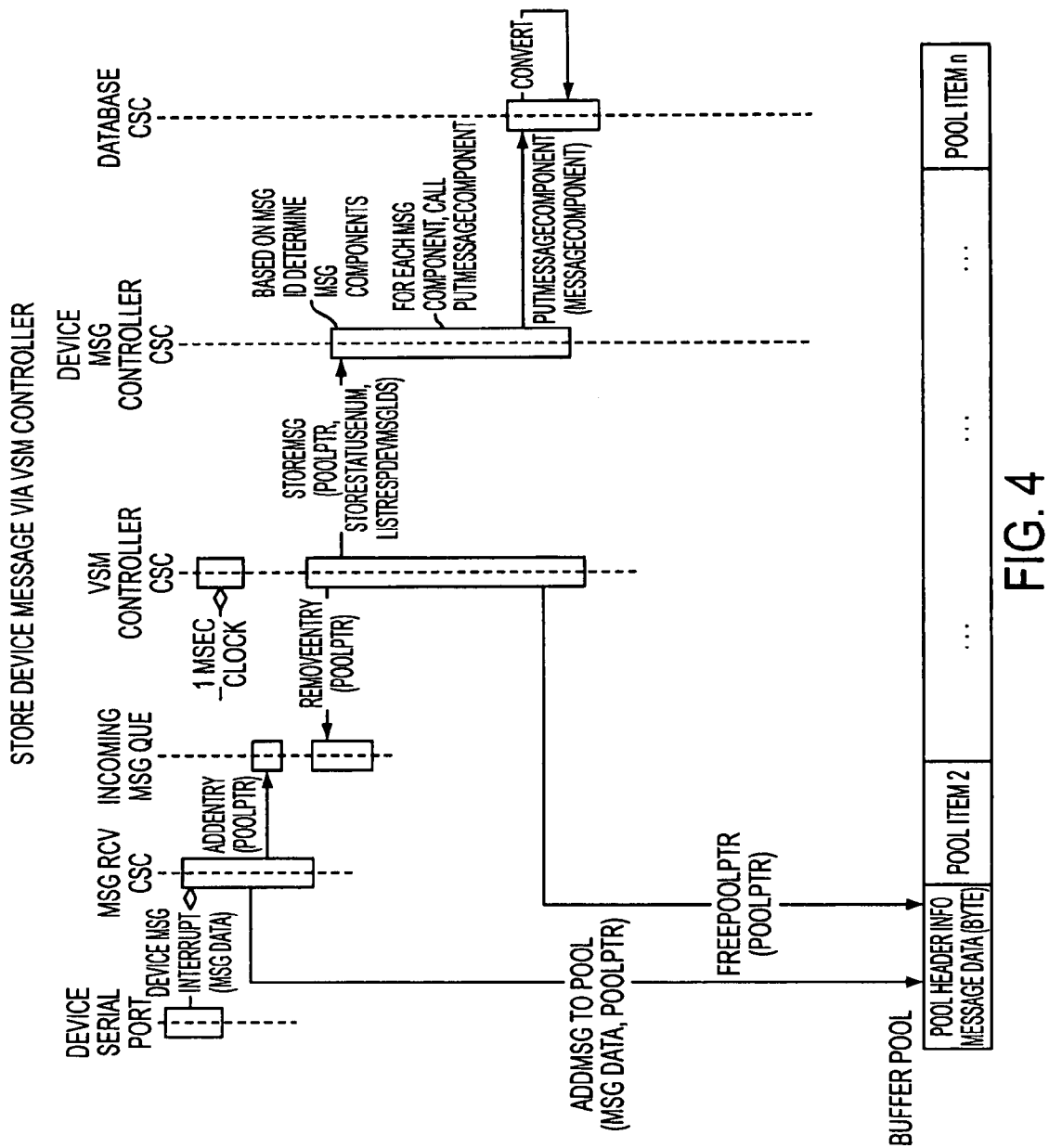
FIG. 4 is a thread diagram showing the processing of an incoming message according to an exemplary embodiment of the present invention.
Figure 5:
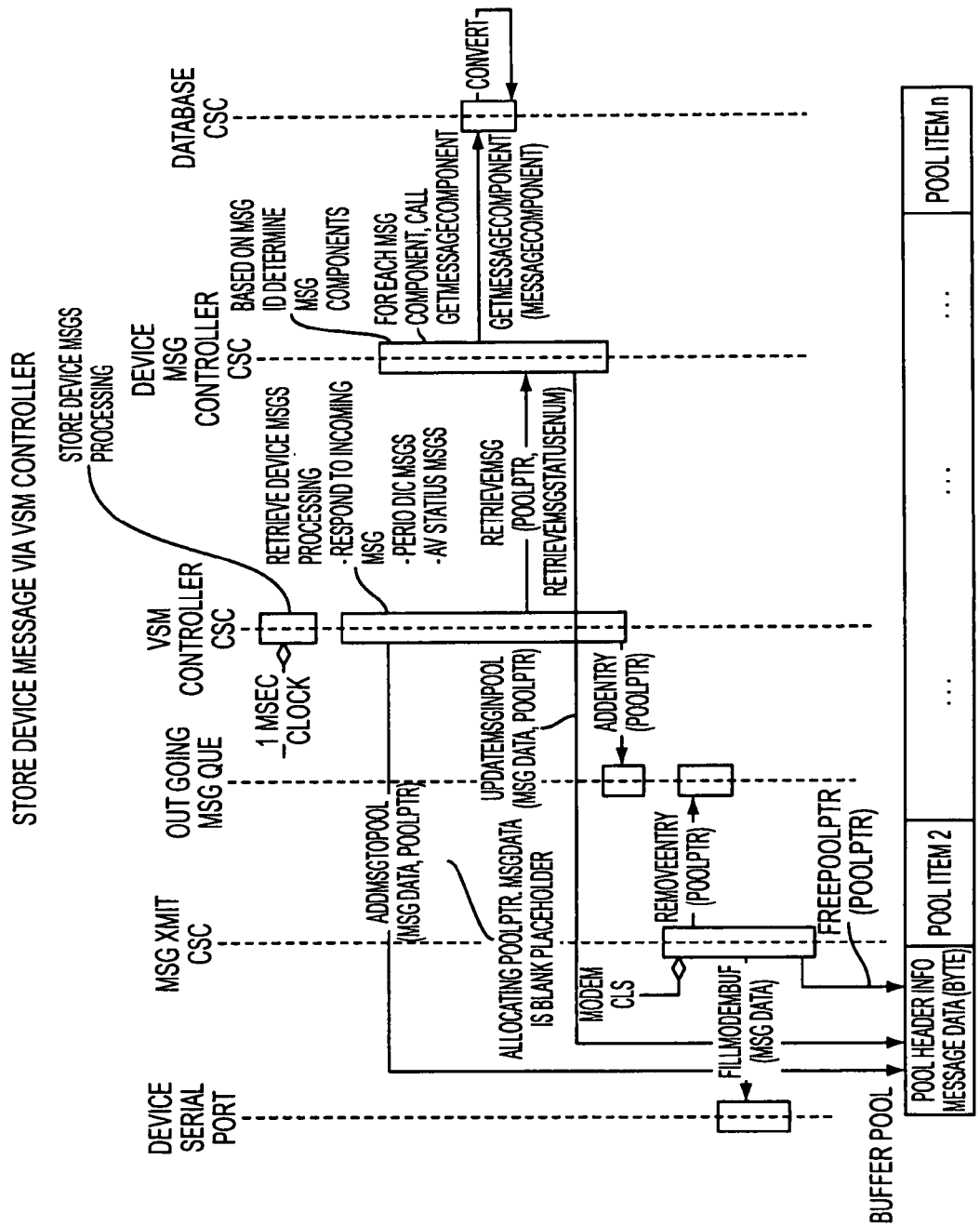
FIG. 5 is a thread diagram showing the processing of an outgoing message according to an exemplary embodiment of the present invention.

In previous systems, the control/status devices were tightly coupled with each other. The devices typically communicated via a serial port and sent inquiries to each other to determine if the other devices had any new information. Embodiments of the invention may utilize a new approach in communicating information. A multithreaded approach that actively checks for new information from the control/status devices may be used. In embodiments of the present invention, the devices 306 place information or messages onto a data storage, such as an incoming message queue 310. The VSM controller 301 checks the incoming message queue 310 at predetermined intervals to retrieve information or messages on the queue. The VSM controller 301 may run through execution cycles during which the VSM controller 301 performs its functions. In an exemplary embodiment, the VSM controller 301 uses the TenAsys InTime® kernel extension for Microsoft Windows 2000® operating system to provide real-time performance. The InTime® kernel extension includes timers with 500 microsecond precision, semaphores, mutexes, shared memory, and threads. In embodiments of the invention, the VSM controller 301 has an execution cycle of 5 milliseconds. The VSM controller 301 checks the incoming message queue 310 for new information every 5 milliseconds. As processors with increased speeds become available, the speed of the execution cycle may be faster, for example 1 millisecond as shown in FIGS. 4 and 5. A separate message queue 310 should be created for each control/status device connected to the SCC 201. Each of GCS 202, GDT 203, VSM GUI 204, UAV 205, pedestal 206, PB 207, and ALS 208 shown in system 200 of FIG. 1 should have its own message queue.

The VSM controller 301 may communicate with a device message controller 302. A separate instance of a device message controller 302 should be created for each control/status device 306 connected to the SCC 201. The device message controllers 302 may be configured to interpret the messages from their corresponding device 306. In the example shown, a device message controller 302 is created for the GCS 202, the UAV 205, the GDT 203, the ALS 208, and the VSM GUI 204. The VSM controller 301 may use the device message controllers 302 to store and retrieve UAV control and status commands from database 312. When new status information is reported from the UAV 205, the status message is placed on the incoming message queue 310 for the UAV 205. The VSM controller 301 retrieves the message from the UAV message queue 310 during the next 5 millisecond timeframe. The VSM controller 301 then provides the message to the UAV device message controller 302. The device message controller 302 may interpret the message to identity the various message components and store the message components in a vehicle system control database 312. Database 312 may hold the commands and status information for all the control/status devices 306. The VSM controller 301 may create an instance of the vehicle system control database 312 based on the ICDs.

In addition to handling incoming messages from the control/status devices 306, the VSM controller 301 may also determine what information needs transmitted to the control/status devices 306 and send that information. Embodiments of the invention provide a message manager 304 to handle outgoing messages. The VSM controller 301 utilizes the message manager 304 to manage the processing of automatic response messages and periodic messages. The processing of automatic response messages and periodic messages should be done every execution cycle. Periodic messages are control and status commands that are sent to the control/status devices 306, based on the corresponding ICDs, in order to satisfy the control/status devices' performance requirements. Automatic response messages are control and status commands sent to control/status devices 306 once specific control and status commands are received.

The VSM controller 301 may communicate a frame number and a stored message ID to the message manager 304. The frame number represents the current period of time. For example, the VSM controller 301 checks the message queues 310 during each execution cycle, here every 5 milliseconds. Each 5 millisecond time period is termed a frame. The frames are numbered consecutively to track elapsed time. Certain actions may need to be carried out periodically or based on the elapsed time. For example, it may be necessary to update the GCS 202 with flight status information every 10 milliseconds. The fact that flight status information that needs to be sent out based on the frame number, or time period, is stored in a framework table database 314. The framework table database 314 defines the information that needs to be sent, the devices requiring the information and the format of messages for the interface. The message manager 304 determines the messages that need to be sent during a particular execution cycle from the framework table database based on the frame number. The message manager 304 gathers the data needed for the message and provides the messages to a storage, such as an outgoing message queue 316. Similar to the incoming message queue, an outgoing message queue 316 should be created for each control/status device 306 in the system 200. The control/status devices 306 retrieve status information and control commands from their respective outgoing message queue 316. The message manager 304 formats the status information and control commands for the devices 306 based on the control/status devices' particular ICD.

The stored message ID identifies the particular type of message the VSM controller 301 retrieved from the incoming message queue 310. Based on the incoming message, a message may need to be sent to one of the control/status devices 306. An automatic response message table 318 tracks when automatic response messages are needed. The message manager 304 retrieves the automatic response message corresponding to the received message's stored message ID. The automatic response table 318 defines the information that needs to be sent, the devices requiring the information and the message format. The message manager 304 gathers the information for the message and provides the message on the corresponding outgoing message queue 316.

For example, when a particular message is received from a UAV 205, the status of the UAV may need to be updated on the GCS 202. The particular UAV message has a unique message ID. The message manager 304 looks up the message ID in the automatic message response table 318. The table indicates that for that particular message ID, a status update including particular data is to be sent to the GCS 202. The message manager 304 may handle this process.

The message manager 304 communicates with the device message controllers 302 in order to retrieve the data that is to be provided to the control/data devices 306. For example, in the automatic message response to the GCS 202 described in the preceding paragraph, assume that the GCS 202 is to be provided with the amount of fuel available in the UAV. The message manager 304 then retrieves the current amount of fuel available from the vehicle system control database 312 via the appropriate device message controller 302. The GCS 202 may automatically be sent the amount fuel when an UAV 205 message with fuel status is received. The UAV fuel message may be used as a lookup in automatic response table 318 to determine if the message has an automatic response. In a particular embodiment of the invention, the device type, UAV, is first used and then the message id, fuel, to determine if there is an automatic response. Each automatic response identifies the device and the particular device message that will be sent. The message manager 304 uses this information to identify which message should be retrieved from which device message controller 302.

The vehicle system control database 312 provides data storage to hold the message data sent and received by the control/status devices 306. The VSM controller 301 creates an instance of the vehicle system control database 312 as described in more detail below. The vehicle system control database 312 stores data items. A data item may be defined as a field in an ICD Message. Control and status commands are stored as and retrieved from the data items. In an exemplary embodiment, the data items are "STANAG 4586 normalized." STANAG refers to a standardization agreement. The North Atlantic Treaty Organization (NATO) has issued a standardization agreement, STANAG 4586 mentioned above, that enables various UAVs to share information through common ground stations, thus enhancing interoperability. The objective of the standardization agreement is to provide a standard for reinforced interfaces, while allowing the particular implementation of the core software to be created in different manner. STANAG normalized means that the data items data type, data format, data range, and data precision are based on the STANAG 4586 data it contains. Embodiments of the invention may be compliant with STANAG 4586. Whenever a data item is being accessed to store or retrieve message data for a control/status device that is not STANAG 4586 compliant, conversions convert from one message format to another, for example, feet to meters, degrees to radians, gallons to liters, etc.

Different messages from different devices may be mapped to the same data item in the database 312. That is, one or more devices can input information into a data item or pull information out of a particular data item. For example, if the UAV has a particular piece of status information stored as a data item. More than one device, such as the UAV 205 or the GDT 203, may place this status information into the corresponding data item in the vehicle system control database. Accordingly, the database always includes the most up-to-date data. When an inquiry for data is made, there is no need to perform any inquiry to retrieve the requested data, the data should already be present in the database.

Embodiments of the present invention provide a system and method to define data items in the vehicle system databases 312. A ICD database 400 (See FIG. 3) defines the particular message formats for data items. The ICD database 400 may be an off-line database, that is non-real time. Embodiments of the present invention also provide a method and system for creating messages provided to the control/status devices that meet the control/status devices' particular ICD. The various devices' ICDs are stored in a database. As the SCC 201 runs, the ICDs stored in the vehicle system database 312, which is based on the offline database 400, are used to define and format the messages provided to the control/status devices. The database can be modified to reflect changes, additions, or deletions from the messages communicated in a deployed UAV system, which includes the UAV 205, the GDT 203, pilot box 207, ALS 208, and UAV control system.

Figure 3:
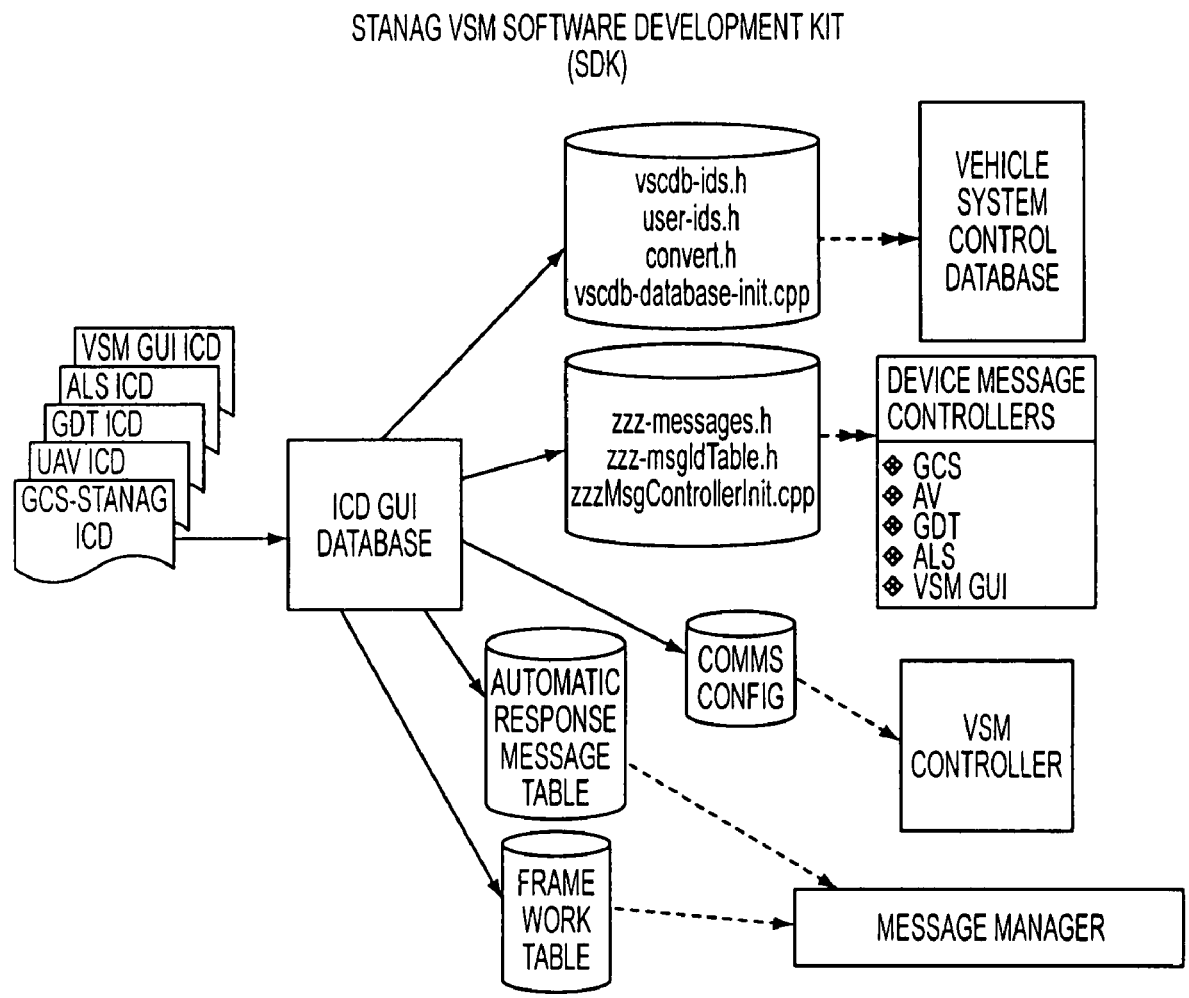
FIG. 3 is a block diagram of a system architecture according to another embodiment of the invention showing the utilization of device ICDs to create a database and configuration files used during real-time.

According to an embodiment of the invention, the database 400 may be created via a software development kit. The ICD database 400 may include the various device messages' data type, data format, data range, data position, and data conversion to be identified and saved. In an exemplary embodiment as shown in FIG. 3, the various ICDs are entered into the database for example, by conversion into a magnetic format, via a GUI. An operator may manually enter each of the ICDs into the GUI. A Microsoft Access ® database may be used. A form is provided to be populated with information from the corresponding ICDs. The GUIs are used to enter the format of the control/status device messages into the message database 400 and then map these messages to data items. The ICDs represent how the various device messages are defined in the various control documents. ICDs for the VSM GUI 204, UAV 205, GCS 202, ALS 208, and GDT 203 may be entered into the database 400. Of course, other methods other than manual entry may also be utilized.

The ICDs may define, among other things, how big a message may be and the format of the message. Once the ICDs are entered into the message database 400, that data is written into text files. These text files are then converted into source code constructs 402 that may be executed and define how the messages are formatted during operation of the SCC 201. In embodiments of the invention, PERL scripts use the text files to create .h and .cpp files that configure the device message controllers 302 and vehicle system control database 312. The source code constructs 402 allow the vehicle system database 312 to be modified as control/status device messages are changed, added or deleted from a deployed UAV system. The VSM controller 301 may compile and link these .h and .cpp files to form an executable image that is used by a deployed UAV system. The source code constructs 402 may be arranged as array structures in an enumerated list. The source code constructs 402 may be compiled to define the vehicle system control database 312 and the device message controllers 302.

The automatic response table 318, framework table 314 and communications configuration file 308 are also created based on the ICDs. Each control/status device message may includes several message components. Each message may have an ICD-based data type, an ICD-based data format, an ICD-based data range, an ICD-based data precision, a mapping to a data item, a stored data item conversion function, a retrieve data item conversion function. The ICD database 400 may also captures the data type, data format, data range, names of conversion functions, and communication protocol parameters, such as, port type (serial or LAN), interrupt level, interrupt register, ISR name, baud rate, message header ID, and message size. This information may be used to configure the automatic response table 318, framework table 314 and communications configuration file 308.

The framework table 314 identifies which control/status device messages from the VSM controller 301 are sent out during a given execution frame. The ICD database 400 balances the workload of the VSM controller execution frame. The automatic message response table 318 identifies which device messages the message manager 304 sends out immediately as a response when the VSM controller 301 receives a particular device message.

FIGS. 4 and 5 are thread diagrams that show how an exemplary software core controller stores and retrieves a device's command. The dashed vertical lines represent separate execution threads in the SCC 201. The solid horizontal lines represent the interprocess communication between threads. Interprocess communication is usually realized as a class method. A horizontal line terminated with a diamond represents a low-level hardware communication mechanism, for example, serial-port communication interrupt, InTime® kernel timer firing, etc.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A software system architecture for communications between a vehicle and at least one external device, the software system architecture comprising:
   a real-time control database;
   a controller adapted to communicate data with the vehicle and the external device via a physical medium in a format defined by a vehicle interface and an external device interface, respectively, the controller adapted to store the data in the real-time control database; and
   a control database to store the vehicle interface and the external device interface, the controller being configured based on the interfaces stored in the control database whereby the controller is abstracted from the physical medium.

2. The system architecture of claim 1, wherein the data includes control and status commands, the controller adapted to store the control and status commands received from the vehicle and the external device in the control database and to retrieve the control and status commands to be sent to the vehicle and the external device from the control database.

3. The system architecture of claim 1, wherein the controller further comprises a respective incoming message queue for each external device, the respective incoming message queues adapted to receive and store data from the corresponding external device.

4. The system architecture of claim 3, wherein the controller is adapted to check the incoming message queues for new data at predetermined time intervals and to retrieve the new data.

5. The system architecture of claim 4, further comprising a respective message controller for each external device and vehicle, controller adapted to provide the data from the incoming message queues to the respective message controller, each respective message controller is adapted to communicate with the real-time control database to store and retrieve the data.

6. The system architecture of claim 1, further comprising a message manager adapted to provide outgoing messages compliant with the respective interface definitions to the external device and vehicle.

7. The system architecture of claim 6, further comprising a storage for the outgoing messages.

8. The system architecture of claim 7, wherein the storage further comprises an outgoing message queue for each external device, the message manager adapted to place data on the outgoing message queues for the respective vehicle or external device.

9. The system architecture of claim 8, wherein the message manager is adapted to receive the data for the outgoing message from the real-time control database via a corresponding message controller.

10. The system architecture of claim 9, wherein the controller is adapted to provide a message ID for new data and a frame number to the message manager and the message manager sends the outgoing message based on at least one of the message ID or the frame number.

11. The system architecture of claim 1, wherein the controller and the real-time control database are configurable based on interface definitions for the vehicle and the external devices.

12. A method for communicating with a vehicle system, comprising:
receiving a interface definition;
creating software code constructs based on the interface definition;
compiling the software code constructs as part of the vehicle control system; and
running the compiled software code constructs to communicate with the vehicle system.

13. The method of claim 12, further comprising:
populating a off-line database with the interface definition;
creating a text file from the off-line database; and
creating the source code constructs based on the text files.

14. The method of claim 12, wherein the interface definition includes at least one of a data type, a data format, a data range, a conversion function, and a communication protocol parameter.

15. The method of claim 12, further comprising defining data items in a real-time control database based on the software code constructs.

16. The method of claim 15, wherein the real-time control database comprises a plurality of data items, wherein a single data item is associated with a plurality of external devices.

17. The method of claim 12, further comprising defining a message controller based on the software code constructs.

18. The method of claim 12, further comprising converting the interface definition to a magnetic format.

19. The method of claim 12, further comprising configuring a controller based on the interface definition.

20. A communication and control method, comprising:
receiving data from a plurality of devices, the devices having different interface definitions;
storing the data in a real-time control database;
checking the real-time control database at predefined time intervals for data;
retrieving the data from the real-time control database;
interpreting the data based on the interface definition for the device;
obtaining a message ID from the data;
determining a time based on the number of elapsed time intervals;
creating a message controller for each of the plurality of devices; and
sending a message to at least one of the plurality of devices based on the message ID or the time.

21. The method of claim 20, wherein the real time control database comprises a respective incoming message queue for each external device.

22. The method of claim 21, further comprising receiving and storing data from the corresponding external device on the respective incoming message queues.

23. The method of claim 22, further comprising placing data on the outgoing message queues for the respective vehicle or external device.

24. The method of claim 20, wherein the real time control database further comprises an outgoing message queue for each external device.

* * * * *